United States Patent
Genty et al.

(10) Patent No.: US 7,467,272 B2
(45) Date of Patent: Dec. 16, 2008

(54) WRITE PROTECTION OF SUBROUTINE RETURN ADDRESSES

(75) Inventors: Denise Marie Genty, Austin, TX (US); Shawn Patrick Mullen, Buda, TX (US); James Stanley Tesauro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 11/014,111

(22) Filed: Dec. 16, 2004

(65) Prior Publication Data

US 2006/0161739 A1    Jul. 20, 2006

(51) Int. Cl.
    *G06F 12/00* (2006.01)
(52) U.S. Cl. ...................................... 711/163; 711/166
(58) Field of Classification Search ........................ None
    See application file for complete search history.

(56) References Cited

U.S. PATENT DOCUMENTS

| | | | | |
|---|---|---|---|---|
| 5,968,169 | A * | 10/1999 | Pickett | 712/239 |
| 7,287,140 | B1 * | 10/2007 | Asanovic et al. | 711/163 |
| 2003/0097546 | A1 * | 5/2003 | Taylor | 712/226 |
| 2003/0204745 | A1 * | 10/2003 | Abrams | |
| 2004/0068607 | A1 * | 4/2004 | Narad | 711/108 |
| 2004/0168078 | A1 * | 8/2004 | Brodley et al. | 713/200 |
| 2004/0205304 | A1 * | 10/2004 | McKenney et al. | 711/148 |
| 2004/0237073 | A1 * | 11/2004 | Wu et al. | 717/154 |
| 2005/0097262 | A1 * | 5/2005 | Falsett et al. | 711/100 |

FOREIGN PATENT DOCUMENTS

JP     2001216161 A2 *  8/2001

* cited by examiner

*Primary Examiner*—Reginald G. Bragdon
*Assistant Examiner*—Ngoc V Dinh
(74) *Attorney, Agent, or Firm*—H. Artoush Ohanian; Matthew Talpis; Biggers & Ohanian LLP.

(57) ABSTRACT

Exemplary methods, systems, and products are described that operate generally by moving subroutine return address protection to the processor itself, in effect proving atomic locks for subroutine return addresses stored in a stack, subject to application control. More particularly, exemplary methods, systems, and products are described that write protect subroutine return addresses by calling a subroutine, including storing in a stack memory address a subroutine return address and locking, by a computer processor, the stack memory address against write access. Calling a subroutine may include receiving in the computer processor an instruction to lock the stack memory address. Locking the stack memory address may be carried out by storing the stack memory address in a protected memory lockword. A protected memory lockword may be implemented as a portion of a protected content addressable memory.

9 Claims, 6 Drawing Sheets

WRITE PROTECTION OF SUBROUTINE RETURN ADDRESSES

BACKGROUND OF THE INVENTION

1. Field of the Invention

The field of the invention is data processing, or, more specifically, methods, systems, and products for write protection of subroutine return addresses.

2. Description of Related Art

Buffer overflow problems are associated with security vulnerabilities. Many security breaches have occurred due to buffer overflow. A buffer is temporary storage area in computer memory, usually in random access memory ('RAM'). The purpose of most buffers is to act as a holding area, enabling a processor or subroutine running on a processor to manipulate data. A stack is kind of buffer in which data is removed in the reverse order from that in which it is added, so the most recently added data is the first removed. This is also called last-in, first-out (LIFO). Adding data to a stack is often referred to as 'pushing.' Removing data from a stack is often called 'popping.'

A buffer may be viewed as a contiguous allocated chunk of memory, such as an array or a pointer in C. In C and C++, there are no automatic bounds checking on the buffer, which means an application or thread of execution can write past a buffer. For example:

```
int main ( )
{
    int buffer[10];
    buffer[20] = 10;
}
```

The above C program is a valid program, and every compiler can compile it without any errors. However, the program attempts to write beyond the allocated memory for the buffer, which will often result in unexpected behavior. Over the years, this concept has been used to cause tremendous damage in the computer industry.

It is first useful to consider how a process relates to computer memory. In this discussion 'instruction stream,' 'thread,' 'thread of execution,' and 'process' are used more or less as synonyms, subject to context, all of them referring to a stream of computer instructions that make up an application program. In this sense, a process or thread is a program in execution. An executable program on a disk contains a set of binary instructions to be executed by the processor; some read-only data, such as printf format strings; global and static data that lasts throughout the program execution; and a brk pointer that keeps track of the malloced memory. (This terminology is from Unix and the Intel platforms generally. The basic ideas of buffer overflow, however, are the same no matter what computer hardware platform or operating system is used.) Subroutine local variables are automatic variables created on the stack whenever functions execute, and they are cleaned up as the subroutine terminates.

Figure 1:
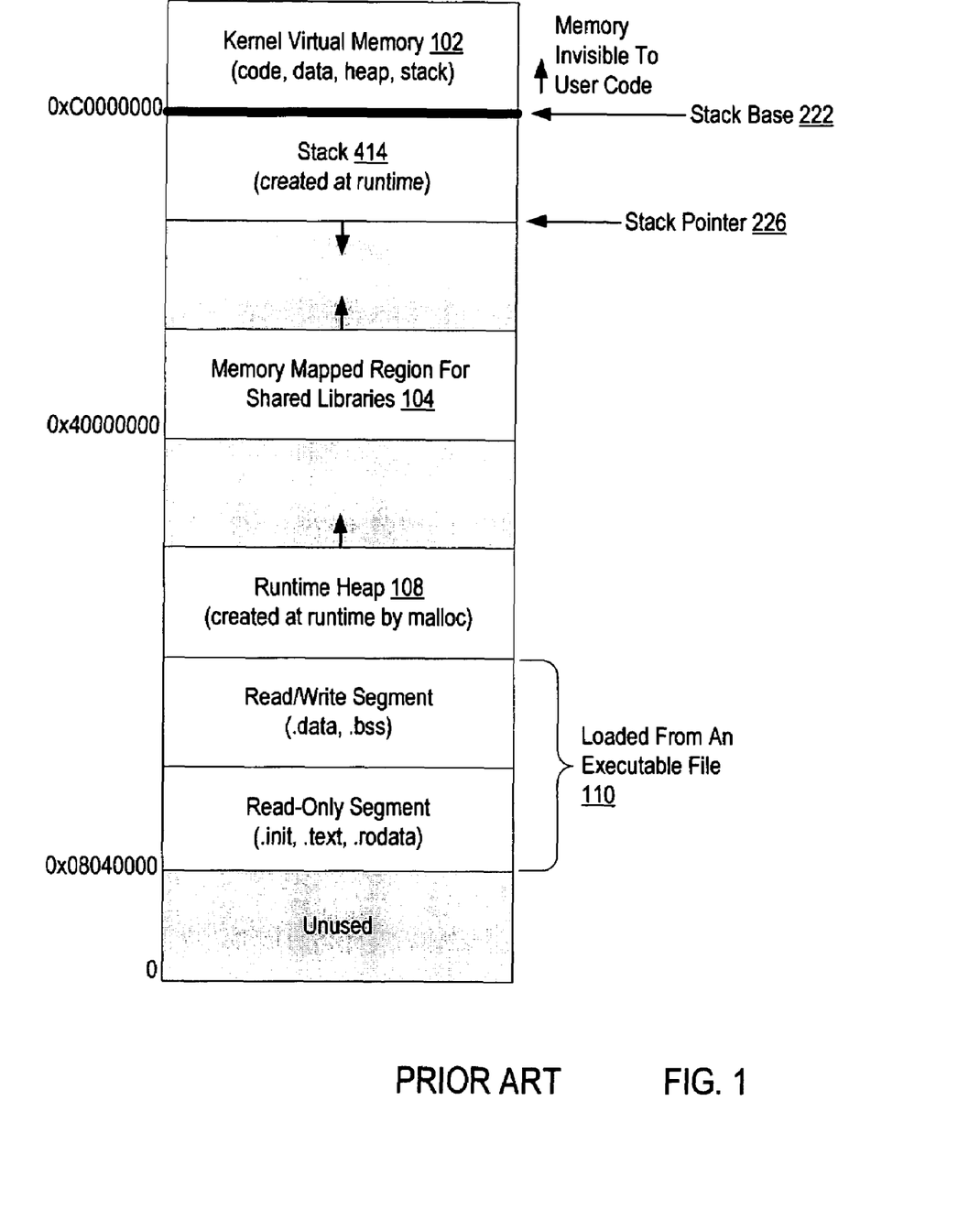
FIG. 1 shows a typical memory layout of a process.

FIG. 1 shows the memory layout of a process. A process image starts with the program's code and data. Code and data include the program's computer instructions and the initialized and uninitialized static and global data, respectively. After that is the run-time heap (created using malloc/calloc), and then at the top is the users stack. This stack is used whenever a subroutine call is made.

A stack is a contiguous block of memory containing data. A stack pointer points to the bottom of the stack. Whenever a subroutine call is made, the subroutine parameters are pushed onto the stack. Then the subroutine return address (address to be executed after the subroutine returns), followed by a frame pointer, is pushed on the stack. A frame pointer is used to reference the local variables and the subroutine parameters, because they are at a known distance from the frame pointer. Local automatic variables are pushed after the frame pointer. In most implementations, stacks grow from higher memory addresses to the lower ones.

Figure 2:
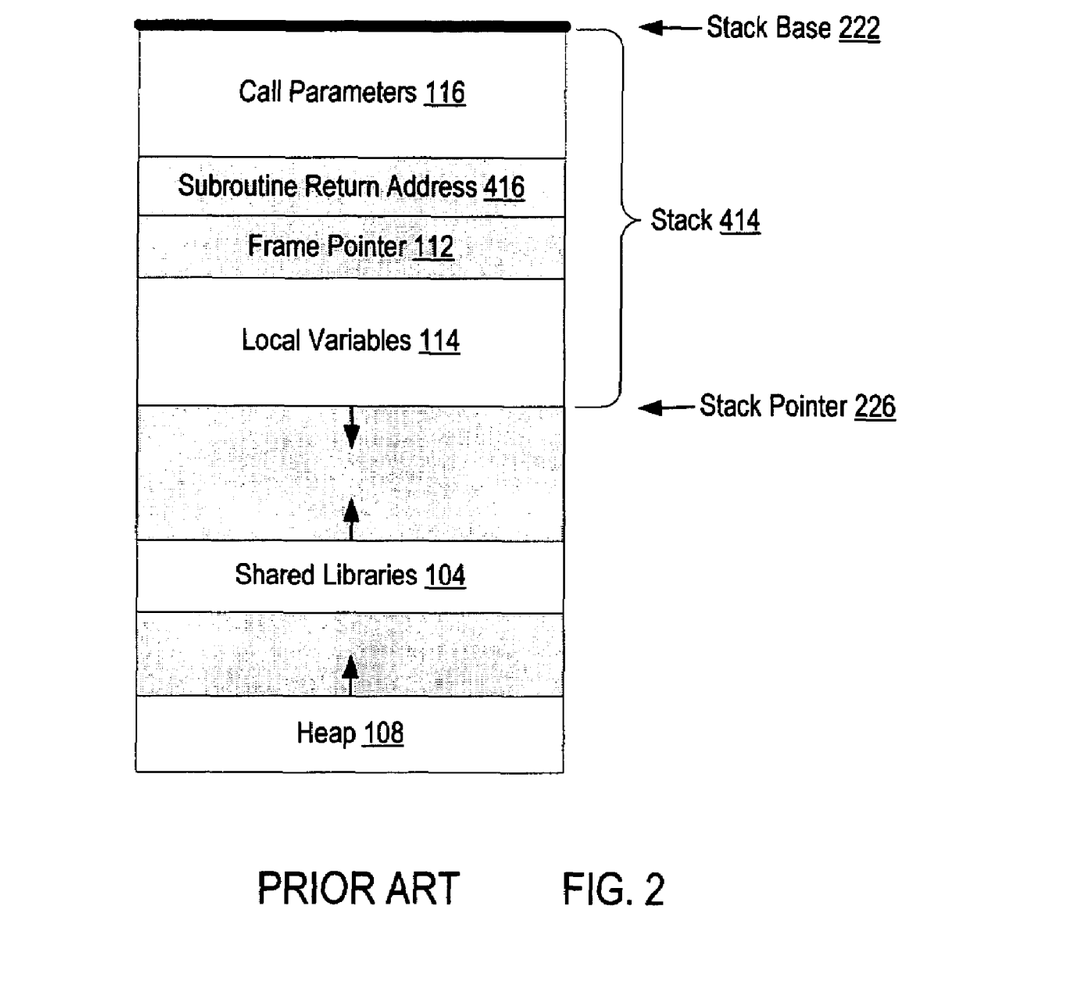
FIG. 2 depicts a typical stack region as it looks when a subroutine call is being executed.
Figure 3:
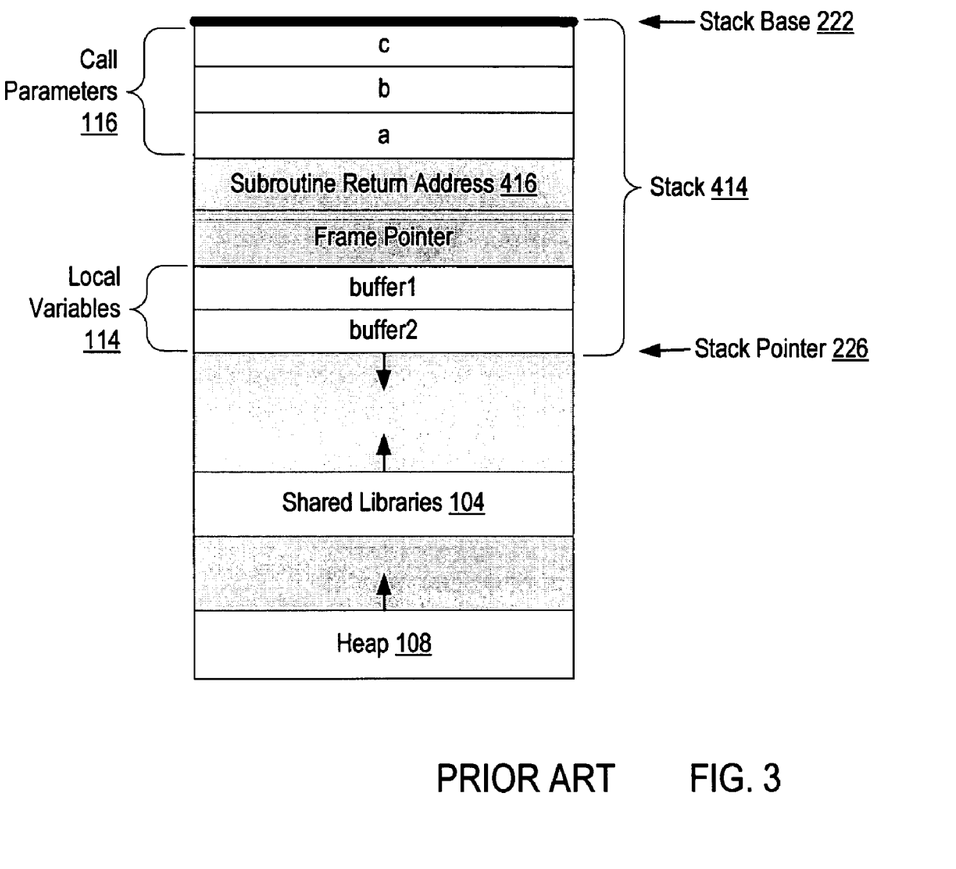
FIG. 3 depicts a typical stack region as it looks when a subroutine call is being executed with three call parameters and two local variables.

FIG. 2 depicts a typical stack region as it looks when a subroutine call is being executed. Notice the frame pointer between the local and the return addresses. For this C example:

```
void subroutine (int a, int b, int c)
{
    char buffer1[5];
    char buffer2[10];
}
int main( )
{
    subroutine(1,2,3);
},
``` the subroutine stack looks like FIG. 3. Buffer1 takes eight bytes and buffer2 takes 12 bytes, as memory can be addressed only in multiples of word size (four bytes, in this example). In addition, a frame pointer is needed to access a, b, c, buffer1 and buffer2 variables. All these variables are cleaned up from the stack as the subroutine terminates. These variables take no space in the binary executable image of the program.

We now turn to a more detailed explanation of buffer overflow. Consider another C example:

```
void subroutine (char *str)
{
    char buffer[16];
    strcpy (buffer, str);
}
int main ( )
{
    char *str = "I am greater than 16 bytes"; // length of str = 27 bytes
    subroutine (str);
}
```

This program is certain to cause unexpected behavior, because a string (str) of 27 bytes has been copied to a location (buffer) that has been allocated for only 16 bytes. The extra bytes run past the buffer and overwrite the space allocated for the frame pointer, return address and so on. This in turn corrupts the stack. The subroutine used to copy the string is strcpy, which completes no checking of bounds. Using strncpy would have prevented this corruption of the stack. However, this traditional example shows that a buffer overflow can overwrite a subroutine's return address, which in turn can alter the program's execution path. Recall that a subroutine's return address is the address of the next instruction in memory, which is executed immediately after the subroutine returns.

Because it is so easy to overwrite a subroutine's return address, an attacker may spawn a shell with root permissions by jumping the execution path to such code. But, what if there is no such code in the program to be exploited? The answer is to place the code that supports the attack in the buffer's overflow area. The attacker then overwrites the return address so it points back to the buffer and executes the intended code. Such code can be inserted into the program using environment variables or program input parameters.

The solutions proposed for buffer overflow problems mainly target the prevention of large-scale system attacks through the loopholes described above, although no current method can claim to prevent all possible attacks. The most often recommended method of preventing such attacks is to write secure code. Buffer overflows result from writing more code into a buffer than it is meant to hold. C library functions such as strcpy ( ), strcat ( ), sprintf ( ) and vsprintf ( ) operate on null terminated strings and perform no bounds checking. Gets ( ) is another subroutine that reads user input (into a buffer) from stdin until a terminating newline or EOF is found. The scanf ( ) family of functions also may result in buffer overflows. The most often recommended method of dealing buffer overflow problems is to not allow them to occur in the first place by minimizing the use of these vulnerable functions.

Another method of preventing buffer overflow attacks is to exclude program execution from stack memory. Because malicious code (for example, assembly instructions to spawn a root shell) is an input argument to a subroutine, it resides in the stack and not in the code segment. One way to prevent execution of such malicious code, therefore, is to invalidate the stack for execution of program instructions. Any code that attempts to execute any other code residing in the stack will cause a segmentation violation—or some other kind of interrupt. This solution is difficult to implement, however, because there are so many legitimate uses of stack execution. Some compilers, for example, use so-called 'trampoline functions' to take the address of a nested subroutine that relies on the stack being executable. A trampoline function is a small piece of code created at run-time when the address of a nested subroutine is taken. Such a trampoline function normally resides in the stack, that is, in the stack frame of the containing subroutine, and thus needs for the stack to be executable.

Runtime tools form the basis of other attempts to address the problem of buffer overflow attacks. Runtime tools concentrate on preventing the subroutine return address from being overwritten, because most attacks occur this way. One such tool copies the return address of a subroutine to a safe place (usually to the start of the data segment) at the start of the subroutine. When the subroutine terminates, it compares the two subroutine return addresses, the one in the stack and the one stored in data segment. Another runtime tool detects and defeats buffer overflow attacks on stacks by protecting the return address on the stack from being altered. The tool places a 'canary' word next to the return address whenever a subroutine is called and detects whether the canary word has been altered when the subroutine returns. Another approach is to follow the frame pointers to the correct stack frame when a buffer is passed as an argument to any of the unsafe functions. This approach then checks the distance to the nearest return address, and when the subroutine executes, it examines that address to prevent its being overwritten.

All the methods and tools described above for addressing the problem of buffer overflow attacks are limited in one manner or another. No software tool can alone solve completely the problem of buffer overflow. Code scrutiny, that is, writing secure code, is still the best overall solution to these attacks, but code scrutiny relies on the cooperation, skill, and honesty of the persons developing the software. Programmers may be tired, unskilled, and in some cases the programmer is the very attacker causing the problem. Compiler warnings may be ignored. There continues to be room for improvement regarding buffer overflow attacks.

SUMMARY OF THE INVENTION

Write protecting a subroutine return addresses including calling a subroutine, including storing in a stack memory address a subroutine return address; locking, by a computer processor, the stack memory address against write access, including storing the stack memory address in a protected memory lockword, wherein the protected memory lockword comprises a portion of a protected content addressable memory; receiving in the computer processor an instruction to write data to the locked stack memory address, further comprising: receiving an instruction to write data to a memory address; and determining, in dependence upon protected memory lockwords, that the instruction to write data to a memory address in an instruction to write data to the locked stack memory, including placing the memory address on the input lines of the content addressable memory and identifying that the content addressable memory output line is set to 'true'; and suspending execution of a current instruction stream in response to the instruction to write data to the locked stack memory address.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for write protection of subroutine return addresses. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Write Protection of Subroutine Return Addresses

Exemplary methods, systems, and products for write protection of subroutine return addresses according to embodiments of the present invention are described with reference to the accompanying drawings, beginning with FIG. 4. Write protection of subroutine return addresses in accordance with the present invention is generally implemented with computers, that is, with automated computing machinery. For further explanation therefore, FIG. 4 sets forth a block diagram of automated computing machinery comprising an exemplary computer (152) useful in write protection of subroutine return addresses according to embodiments of the present invention. The computer (152) of FIG. 4 includes at least one computer processor (156) or 'CPU' as well as random access memory (168) ("RAM") which is connected through a system bus (160) to processor (156) and to other components of the computer.

Stored in RAM (168) is an application that write protects subroutine return addresses according to embodiments of the present invention. The application (106) is a computer program represented by one or more processes or threads of execution that include computer program instructions that write protect subroutine return addresses according to embodiments of the present invention. Also stored in RAM (168) is an operating system (154). Operating systems that are useful in computers according to embodiments of the present invention include UNIX™, Linux™, Microsoft NT™, AIX™, IBM's i5/OS™, and others as will occur to those of skill in the art. Operating system (154) and application (106) in the example of FIG. 4 are shown in RAM (168), but many components of such software typically are stored in non-volatile memory (166) also.

Figure 4:
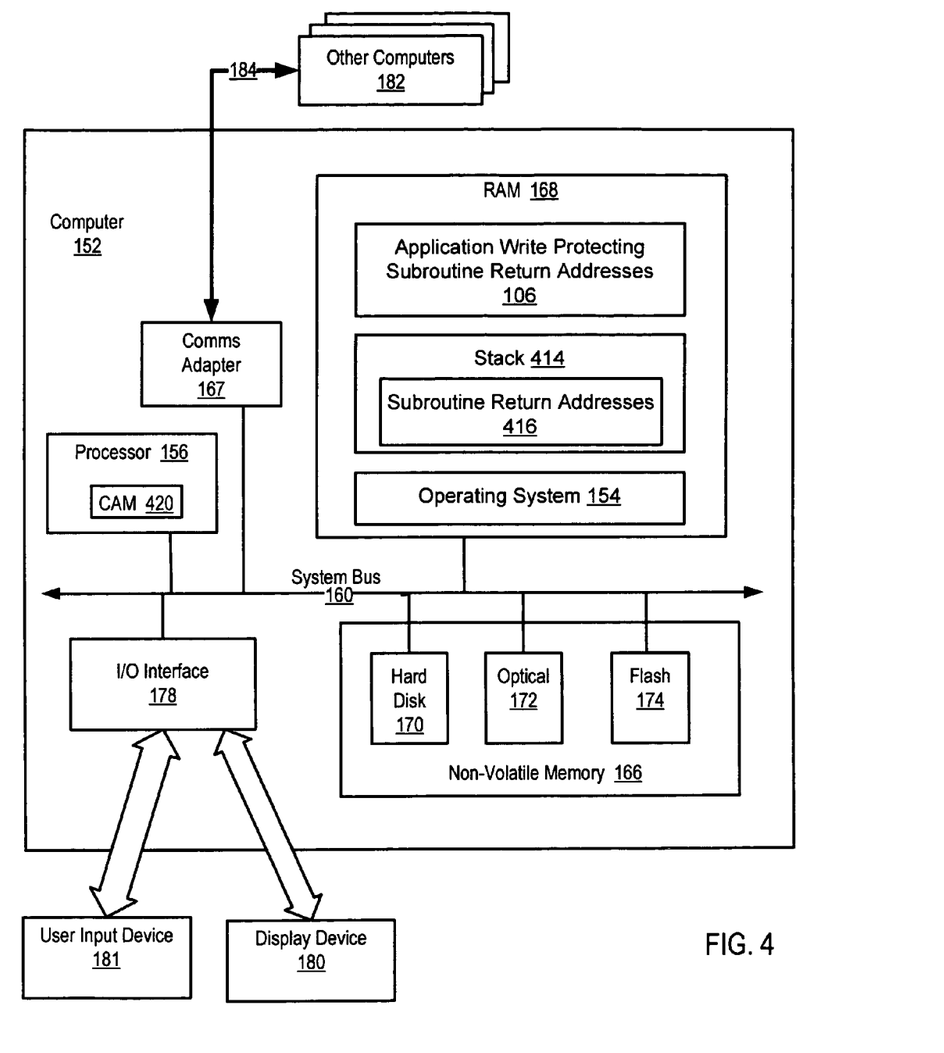
FIG. 4 sets forth a block diagram of automated computing machinery comprising an exemplary computer useful in write protection of subroutine return addresses according to embodiments of the present invention.

Computer (152) of FIG. 4 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 4 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 4 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 5:
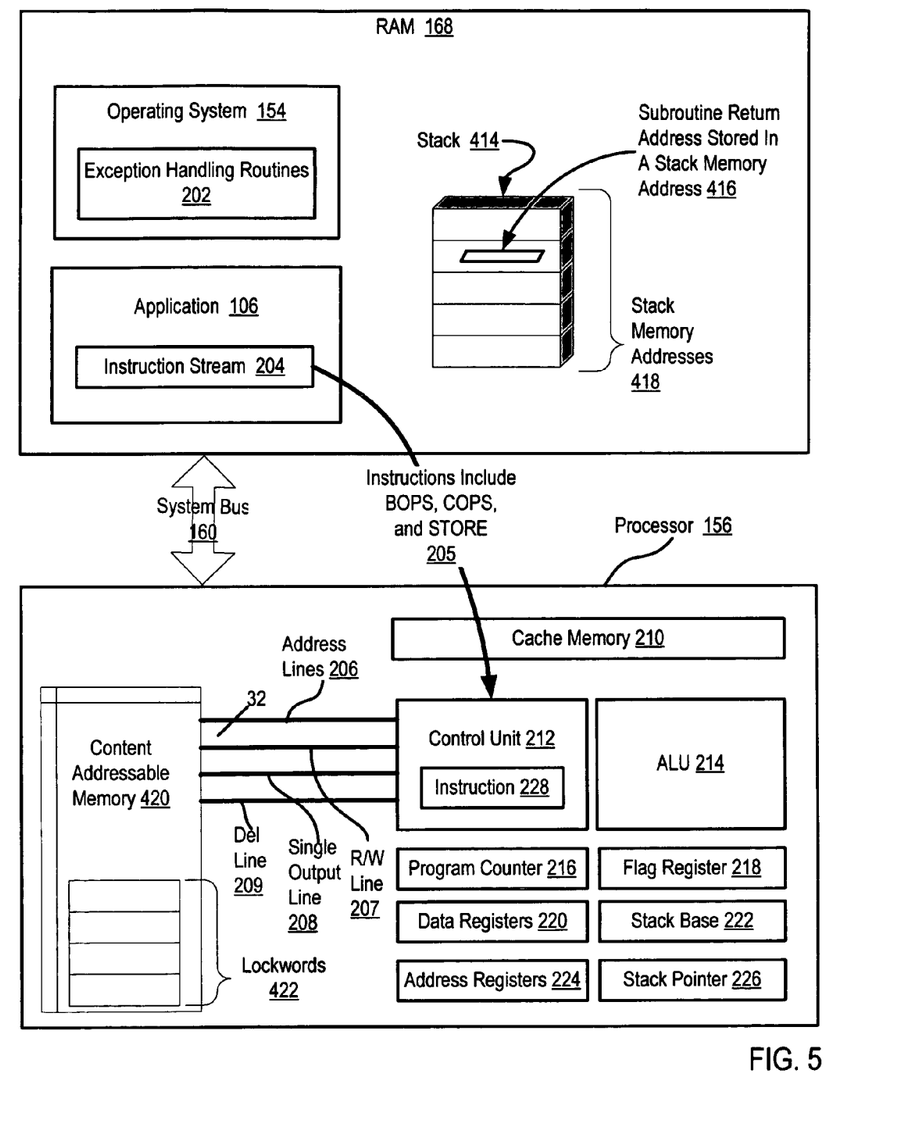
FIG. 5 sets forth a functional block diagram of an exemplary system for write protection of subroutine return addresses according to embodiments of the present invention.

For further explanation, FIG. 5 sets forth a functional block diagram of an exemplary system for write protection of subroutine return addresses according to embodiments of the present invention. The system of FIG. 5 includes a random access memory ('RAM') (168) in which is disposed a computer software application (106) that includes a stream of computer program instructions directed to a control unit (212) in a computer processor (156). Also disposed in RAM (168) is a stack (414), including stack memory addresses (418) and one or more subroutine return addresses stored in stack memory addresses (416). The system of FIG. 5 includes a processor (156) that executes instructions (205) from the instruction stream (204). Processor (156) includes cache memory (210), a control unit (212), an arithmetic-logic unit or ALU (214), a program counter (216), a flag register (218), data registers (220), a stack base register (222), address registers (224), and a register for a stack pointer (226).

Control unit (212) contains control logic or microcode that fetches data and instructions and decodes addresses for the ALU. The ALU carries out arithmetic, logical, and shifting operations on data presented to it by the control unit. In addition to the ALU, which typically carries out integer arithmetic operations, a processor may also include a floating point unit for floating point operations—not shown in FIG. 5. Processor (156) is typically implemented as one or more integrated circuits, 'chips.' Along the sides of a chip are pins that plug into a socket in a system board, connecting the processor to the system bus (160), RAM (168), and to the rest of the computer. The registers, program counter, flag register, and so on, are inside the processor chip. When data or program instructions are to be fetched from memory, an address is calculated by the control unit and sent along the system bus. The value from memory, either an instruction or data, is sent back to the processor via the system bus.

Registers in this example are high speed storage areas on the processor itself. The program counter (216), sometimes called an 'instruction address register' or an 'instruction pointer,' always contains the address of the next instruction to be executed. The flag register (218), sometimes called a 'program status word,' has its individual bit positions assigned to represent the status of the processor or the result of ALU operations. Individual bit positions are given names and referred to as 'flags.' Some flags may be set under program control to advise the processor how to behave in certain circumstances; others are set by the processor to advise the program the results or status of operations on the processor. Examples of flags include representations of a zero result of an ALU operation, a sign result, parity, carry, traps for debuggers, ALU overflow, and memory index direction.

Data registers (220), sometimes called 'general purpose register,' are used for data movement, data storage during processor operations, and for storing operands and results of ALU operations. A data register preferred for storing results of ALU operations is sometimes called an 'accumulator.' In typical processors today, there are multiple data registers. Address registers (224) are used to store addresses of variables and index values for indexed memory operations. Just as many processors today implement a multiplicity of data registers, so do they also typically include a multiplicity of address registers. The stack base register (222) is used to store the base address of the stack, thereby making it immediately available to the processor for stack operations. The stack pointer contains the next available stack memory address for push operations to the stack. Stacks typically grow downwards in RAM. So a push operation typically writes data to the memory address identified by the stack pointer and then decrements the stack pointer to point to the next available stack memory address.

The arrangement of the components of the systems of FIGS. 4 and 5, the RAM, the registers of the processor, and so on, are for explanation, not for limitation. Systems for write protection of subroutine return addresses according to embodiments of the present invention may be implemented using any computer processor, any arrangement of RAM, and any arrangement of registers as may occur to those of skill in the art. Various embodiments of the present invention may be implemented on a variety of hardware platforms in addition to those illustrated in FIGS. 4 and 5.

Application (106) operates generally to write protect subroutine return addresses when it calls subroutines by storing in a stack memory address (418) a subroutine return address (416) and locking the stack memory address against write access by providing to the control unit (212) in the processor (156) an instruction (228) to do so. In this example, computer instructions regarding locking stack memory addresses are represented by BOPS, COPS, and STORE (205). A 'BOPS' instruction is an exemplary mnemonic such as an assembler instruction that abbreviates 'Buffer Overflow Protect On Store.' Of course the instruction could have been given any name that might occur to one of skill in the art, but this one is used here, in view of its mnemonic value, for convenience of explanation. Similarly, 'COPS' is mnemonic for 'Clear Overflow Protect On Store.' The STORE instruction is representative of all computer program instructions that write data to RAM. Examples of such instruction in Intel assembly languages include:

- STOB—for storing a byte,
- STOW—for storing a word,
- STOS—for storing a string, and
- MOV—copies a byte or word from a source to a memory location.

Examples of STORE instructions in PowerPC assemblers include:

- STB—store byte,
- STBU—store byte with update,
- STBUX—store byte with update indexed,
- STBX—store byte indexed,
- STH—store half word,
- STHBRX—store half word—byte reverse indexed,
- STHU—store half word with update,
- STHUX—store half word with update indexed,
- STHX—store half word indexed,
- STMW—store multiple word,
- STSWI—store string word immediate,
- STSWX—store string word indexed,
- STW—store word,
- STWBRX—store word byte reverse indexed,
- STWU—store word with update,
- STWUX—store word with update indexed, and
- STWX—store word indexed.

Other assembly languages and processors that may be improved for write protection of subroutine return addresses according to embodiments of the present invention include, for example, those for AMD's Athlon and Opteron processors, Sun's SPARC processors, and others as will occur to those of skill in the art. Other examples of computer instructions to write data to memory will occur to those of skill in the art, and the improvement of all such instructions for write protection of subroutine return addresses is well within the scope of the present invention.

In the example of FIG. 5, processor (156), locks a stack memory address containing a subroutine return address against write access in response to receiving in the computer processor an instruction to lock the stack memory address, that is, in this example, a BOPS instruction. The control unit (212) decides the BOPS instruction and executes it, locks the stack memory address, by storing the stack memory address in a protected memory lockword. In this example, the protected memory lockword is a portion, that is a segment, byte, or word, of a protected content addressable memory ('CAM') (420).

Other ways of locking a stack memory address through a processor are within the scope of the present invention, lookup tables, linked lists, and so on, as will occur to those of skill in the art. The CAM (420) is used here for explanation of write protection of subroutine return addresses because of it relative simplicity. Control unit (212) need only place on the address lines (206) of CAM (420) the stack memory address of a subroutine return address stored in a stack and then drive the read/write line (207) active for a write, thereby storing the stack memory address in the CAM and locking the stack memory address.

The stack memory address stored in the CAM is locked in this sense: When the processor (156) receives a STORE instruction to write data to the locked stack memory address, then, in response to such a STORE instruction, the processor suspends execution of the current instruction stream, that is, suspends execution of the instruction stream (204) that issued the STORE instruction. Upon receiving any STORE instruction, that is, any instruction to write to RAM, the processor may determine whether the STORE instruction attempts to write to a locked stack memory address by placing upon the address lines (206) of the CAM (420) the memory address of the STORE instruction. If the output line (208) of the CAM remains inactive, the STORE's target address is not locked. If the output line (208) of the CAM goes active, the STORE's target address is locked.

Suspending execution of the instruction stream that issued the offending STORE may be implemented by a processor-detected exception. Two classes of events typically cause a processor to suspend execution of a current instruction stream, a thread or process, and respond to the event: interrupts and exceptions. In both cases, the processor saves the context of the current thread or process and transfers execution to a predefined routine to service the condition. An 'interrupt' is generated by a signal from hardware, and it may occur at random times during the execution of a program. An 'exception' is generated from software, and it is provoked by the execution of an instruction. Examples of interrupts include maskable interrupts received on a processor interrupt input pin, ignored except when the processor's interrupt enable flag is set, and non-maskable interrupts received on the processor's non-maskable interrupt pin. Examples of exceptions include processor-detected exceptions, generated when a processor encounters an error while attempting to execute an instruction, and programmed exception, generated under application control. The system of FIG. 5 includes an operating system (154) that in turn provides a set of vectored exception handling routines (202). Examples of processor-detected exceptions include:
 divide errors: division overflow or division by zero,
 undefined op code,
 memory page fault,
 floating point error, and
 memory write alignment error, access to a word stored at an odd byte address or a doubleword stored at an address not a multiple of four.

When a subroutine that locked its return address returns execution control from the subroutine to its calling routine, the processor of FIG. 5 may unlock the locked stack memory address and branch to the subroutine return address. The processor may unlock the stack memory address containing the subroutine memory address by removing the stack memory address from the CAM (420), by, for example, placing the stack memory address on the CAM address lines (206) and activating a delete line (209). The processor may branch to the subroutine return by popping the link return address to the program counter (216) allowing execution to continue at that address.

Figure 6:
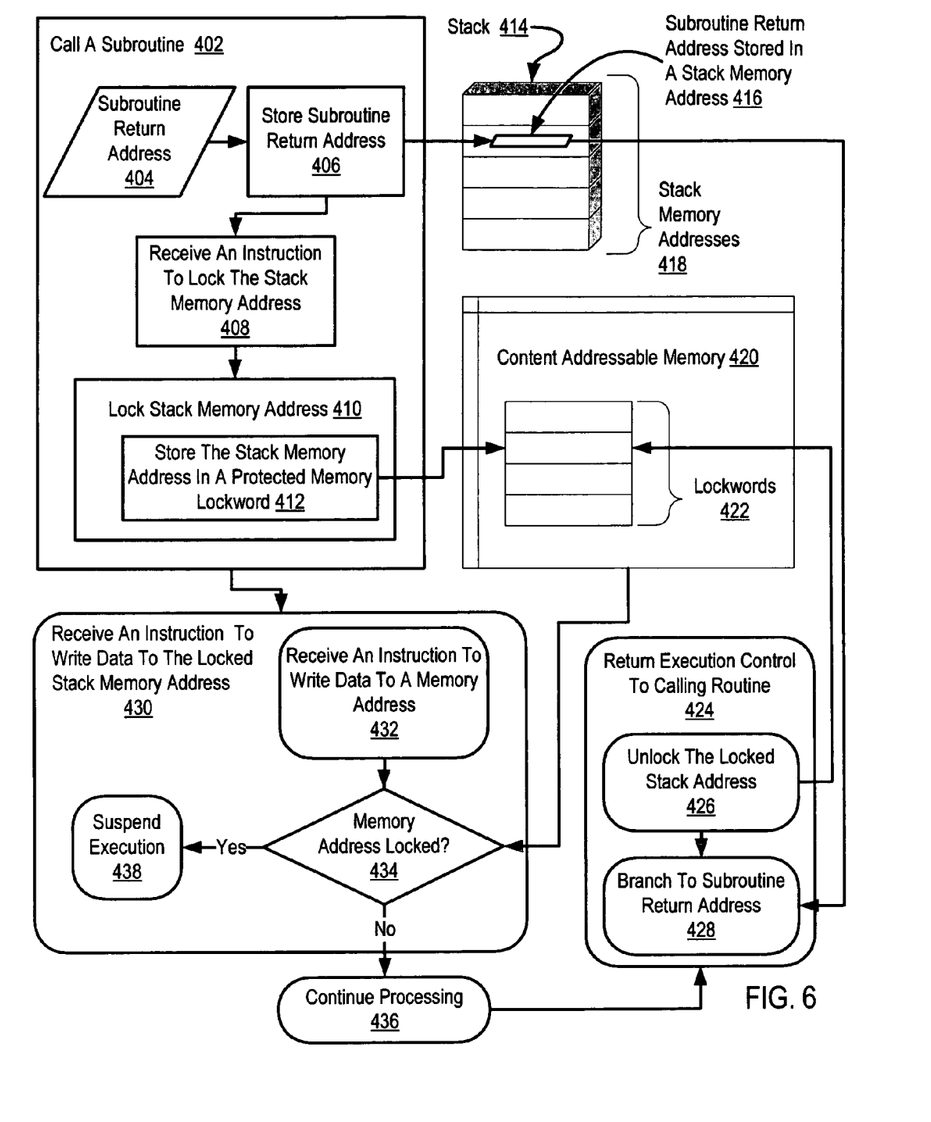
FIG. 6 sets forth a flow chart illustrating an exemplary method for write protection of subroutine return addresses according to embodiments of the present invention.

For further explanation, FIG. 6 sets forth a flow chart illustrating an exemplary method for write protection of subroutine return addresses according to embodiments of the present invention that includes calling (402) a subroutine, including storing (406) in a stack memory address (418) a subroutine return address (404), and locking (410), by a computer processor, the stack memory address against write access. In this example, calling (402) a subroutine includes receiving (408) in the computer processor an instruction to lock the stack memory address.

Locking (410) the stack memory address is carried out in this example by storing (412) the stack memory address in a protected memory lockword (422). The protected memory lockword is a portion of a protected content addressable memory ('CAM'). That is, in this example, locking the stack memory address against write access is carried out by storing the locked stack memory address in a storage location in a CAM (420). The fact that the locked stack memory address is present in the contents of the CAM represents a lock on the stack memory address. The lock is effected by checking for its presence upon every write to RAM from the processor.

The method of FIG. 6 also includes receiving (430) in the computer processor an instruction to write data to the locked stack memory address and, in response to the instruction to write data to the locked stack memory address, suspending (438) execution of a current instruction stream. Suspending execution of a current instruction stream may be effected by a vectored interrupt generated by the processor, sometimes called a processor-detected exception. If the currently executing thread has registered for inter-process communications with signals, the exception handler may advise the thread of the write protection error and allow the thread an opportunity to correct the error. If the thread is not registered for signals and no other means of interprocess communications is available, the exception handler may kill the thread. Either way, no data is written to a locked stack memory address.

When the processor first receives and decodes the instruction to write data to the locked stack memory address, the processor does not know that the instruction is an instruction to write data to the locked stack memory address. Receiving (430) the instruction to write data to the locked stack memory address therefore also includes receiving (432) an instruction to write data to a memory address (not yet known to be a locked stack memory address) and determining (434), in dependence upon protected memory lockwords (422), that the instruction to write data to a memory address is in fact an instruction to write data to the locked stack memory. Determining (434), in dependence upon protected memory lockwords (422), that the instruction to write data to a memory address is in fact an instruction to write data to the locked stack memory may be implemented by placing the memory address (not yet known to be a locked stack memory address) on the input lines (206 on FIG. 5) of the CAM (430). If the CAM output line (208 on FIG. 5) reads 'true,' then the memory address is a locked stack memory address and execution is suspended (438). If the CAM output line (208 on FIG. 5) reads 'false,' then the memory address is not a locked stack memory address and processing continues normally (436).

If processing continues long enough, eventually the current subroutine will return control to its calling routine. The method of FIG. 6 therefore includes returning (424) execution control from the subroutine to a calling routine. In this example, returning execution control includes unlocking (426) the locked stack memory address and branching (428) to the subroutine return address. Unlocking the locked stack memory address may be carried out by issuing a COPS command shortly before or shortly after branching to the subroutine return address. Branching to the subroutine return address is implemented by popping the subroutine return address off the stack and allowing execution to continue from that address.

Persons of skill in the art will understand from the explanations set forth above in this specification that the benefits of write protection of subroutine return addresses according to embodiments of the present invention include
 provision of atomic locks for stack memory addresses; such locks are 'atomic' in the sense that no changes to a locked stack memory address can be made so long as the locking subroutine is in possession of the lock; said another way: the processing in the subroutine between the acquisition of the lock and the release of the lock is 'atomic' with respect to its subroutine return address;
 prevention of buffer overflow attacks by using an atomic lock to exclude overwrite of a subroutine return address before an executing subroutine branches to that address;
 compilers implementing assembler commands that utilize the atomic locks according to embodiments of the present invention can automatically build into all applications compiled through them write protection of subroutine return addresses; and
 compilers implementing assembler commands that utilize the atomic locks provided by system for write protection of subroutine return addresses according to embodiments of the present invention may prevent buffer overflows regardless of sloppy programming at the application level.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for write protection of subroutine return addresses, the method comprising:
 calling a subroutine, including storing in a stack memory address a subroutine return address;

locking, by a computer processor, the stack memory address against write access, including storing the stack memory address in a protected memory lockword, wherein the protected memory lockword comprises a portion of a protected content addressable memory;

receiving in the computer processor an instruction to write data to the locked stack memory address, further comprising:

receiving an instruction to write data to a memory address; and determining, in dependence upon protected memory lockwords, that the instruction to write data to a memory address is an instruction to write data to the locked stack memory, including placing the memory address on the input lines of the content addressable memory and identifying that the content addressable memory output line is set to 'true'; and suspending execution of a current instruction stream in response to the instruction to write data to the locked stack memory address.

2. The method of claim 1 wherein calling a subroutine further comprises receiving in the computer processor an instruction to lock the stack memory address.

3. The method of claim 1 further comprising returning execution control from the subroutine to a calling routine, including:

unlocking the locked stack memory address; and branching to the subroutine return address.

4. A system for write protection of subroutine return addresses, the system comprising:

means for calling a subroutine, including storing in a stack memory address a subroutine return address;

means for locking, by a computer processor, the stack memory address against write access, including storing the stack memory address in a protected memory lockword, wherein the protected memory lockword comprises a portion of a protected content addressable memory;

means for receiving in the computer processor an instruction to write data to the locked stack memory address, further comprising:

means for receiving an instruction to write data to a memory address; and means for determining, in dependence upon protected memory lockwords, that the instruction to write data to a memory address is an instruction to write data to the locked stack memory, including means for placing the memory address on the input lines of the content addressable memory and means for identifying that the content addressable memory output line is set to 'true'; and means for suspending execution of a current instruction stream in response to the instruction to write data to the locked stack memory address.

5. The system of claim 4 wherein means for calling a subroutine further comprises means for receiving in the computer processor an instruction to lock the stack memory address.

6. The system of claim 4 further comprising means for returning execution control from the subroutine to a calling routine, including:

means for unlocking the locked stack memory address; and means for branching to the subroutine return address.

7. A computer program product for write protection of subroutine return addresses, the computer program product comprising:

a recording medium;

means, recorded on the recording medium, for calling a subroutine, including storing in a stack memory address a subroutine return address;

means, recorded on the recording medium, for locking, by a computer processor, the stack memory address against write access, including storing the stack memory address in a protected memory lockword, wherein the protected memory lockword comprises a portion of a protected content addressable memory;

means, recorded on the recording medium, for receiving in the computer processor an instruction to write data to the locked stack memory address, further comprising:

means, recorded on the recording medium, for receiving an instruction to write data to a memory address; and means, recorded on the recording medium, for determining, in dependence upon protected memory lockwords, that the instruction to write data to a memory address is an instruction to write data to the locked stack memory, including means, recorded on the recording medium, for placing the memory address on the input lines of the content addressable memory and means, recorded on the recording medium, for identifying that the content addressable memory output line is set to 'true'; and means, recorded on the recording medium, for suspending execution of a current instruction stream in response to the instruction to write data to the locked stack memory address.

8. The computer program product of claim 7 wherein means, recorded on the recording medium, for calling a subroutine further comprises means, recorded on the recording medium, for receiving in the computer processor an instruction to lock the stack memory address.

9. The computer program product of claim 7 further comprising means, recorded on the recording medium, for returning execution control from the subroutine to a calling routine, including:

means, recorded on the recording medium, for unlocking the locked stack memory address; and means, recorded on the recording medium, for branching to the subroutine return address.

* * * * *